3,087,805
PHYTOHORMONAL METHODS
Jean Metivier, Arpajon, France, assignor to Societe des Usines Chimiques Rhone-Poulenc, Paris, France, a body corporate of France
No Drawing. Filed Dec. 7, 1959, Ser. No. 857,523
Claims priority, application France Nov. 18, 1957
2 Claims. (Cl. 71—2.6)

This invention relates to compositions having phytohormonal activity.

The new phytohormonal compositions comprise, as active ingredient, at least one compound of the formula:

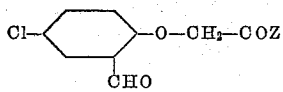

where Z represents —OH, —OM (where M is a cation of an inorganic or organic base), —OR (where R is an alkyl group) or

(where $R_1$ and $R_2$, which may be the same or different, are hydrogen atoms or alkyl groups), and at least one diluent. The foregoing compounds are 2-formyl-4-chloro phenoxyacetic acid and its salts, esters and amides. The said acid is described by Stoermer, Annalen der Chemie, 312, p. 326 (1900). The corresponding 2-formyl-4-chloro-phenoxyacetic acid chloride may be obtained by the action of thionyl chloride on the acid in a benzene reaction medium. The amide of the acid is obtained by reaction of a 20% aqueous solution of ammonia on the 2-formyl-4-chloro-phenoxyacetic acid chloride; it crystallises from 50% ethanol with M.P. 189° C. The esters of the acid may be made by conventional methods; thus for example the methyl ester is made by reaction of methanol with the 2-formyl-4-chloro-phenoxyacetic acid chloride in the presence of triethylamine; is has M.P. 69° C.

The active ingredients of the new compositions have very valuable phytohormonal activity, that is to say, in very small doses they modify the growth of plants. This activity may be demonstrated in various ways. Thus in the laboratory these compounds manifest their action by accelerating the functioning of meristematic tissue (growth in thickness) as is shown by the lanolin ring test using a composition containing 1% of the active compound, by the formation of new organs (roots) as shown by tests for the formation of roots on tomato leaves or beanstalks, and by the production of parthenocarpic fruits, which, because they have not been naturally fertilised, are seedless, as shown by the treatment of emasculated tomato flowers.

The properties of the active ingredients are distinguished from those of previously known compounds of similar constitution, for example 4-chloro-, 2:4-dichloro- and 2-methyl-4-chloro-phenoxyacetic acids and their derivatives, by being distinctly less phytotoxic, so that their phytohormonal properties are of practical use. Compared with the corresponding hydroxymethyl derivatives, they have the advantage of much more rapid action.

The compositions of this invention may take any of the physical forms which are conventional for phytohormonal compositions. For example, they may be solid formulations in which the active ingredient is mixed with a solid diluent, for example talc, clay or other inert diluent, or they may be liquid formulations in which the active ingredient is dissolved or dispersed in a liquid, preferably water. These liquid compositions may with advantage contain ionic or non-ionic wetting, dispersing or emulsifying agents, nonionic agents being preferred because of their insensitivity to electrolytes. Emulsions suitable for application may be obtained by dilution of concentrated commercial emulsions. Alternatively, emulsions may be obtained by dispersing in a suitable liquid emulsifiable concentrates, for example comprising the active compound dissolved in a suitable dispersing agent, or in a mixture of such a dispersing agent with another solvent for the active compound. Aqueous solutions suitable for use may be prepared by dissolving those active compounds which are water-soluble, or solid or liquid concentrates containing them, in water.

The percentage of active compound in the compositions, whether they are concentrates which will be further diluted before use, or are dilute compositions suitable for direct use, can vary widely. In the case of liquid compositions a concentration of active compound in the range 0.004 to 0.1% by weight is suitable for use. In the case of solid compositions a concentration of active compound in the range 0.04 to 1.0% is suitable for use.

The following examples illustrate the invention.

*Example I*

A concentrate is prepared by dissolving 5 g. of 2-formyl-4-chloro-phenoxyacetic acid in 50 cc. of acetone, and adding 10 g. of Scurol AO (a polycondensate of ethylene oxide and oleic acid). For application, one part of the concentrate is mixed with 500 to 1000 parts of water. This composition can be used on tomato plants, by spraying onto the flowers, to produce pathenocarpic fruits.

*Example II*

A concentrate having the following composition is prepared:

| | |
|---|---|
| 2-formyl-4-chloro-phenoxyacetic acid _____ g__ | 20 |
| N sodium hydroxide _____ cc__ | 93 |
| Acetone _____ cc__ | 20 |
| Glycerin _____ cc__ | 150 |
| Water, q.s. 1000 cc. | |

The concentrate, when diluted to the extent of 2 to 20 cc. of concentrate per litre of water, is suitable for spraying tomato plants.

*Example III*

5 g. of 2-formyl-4-chloro-phenoxyacetic acid, as the sodium salt, are intimately mixed with 95 g. of sodium sulphate. The powder thus prepared can be dissolved in water to give a solution of concentration 1 to 20 g. per litre for use in the propagation of plants by cuttings, the cuttings being dipped in the solution.

*Example IV*

1 g. of 2-formyl-4-chlorophenoxyacetamide is intimately mixed with 99 g. of talc. The powder thus obtained is used in the propagation of plants by means of cuttings.

*Example V*

100 g. of talc is impregnated with a solution of 0.05 g. of the methyl ester of 2-formyl-4-chloro-phenoxyacetic acid in 100 cc. of acetone. The acetone is allowed to evaporate and the residue is used in the propagation of plants by cuttings.

I claim:
1. A method of producing parthenocarpic tomatoes which comprises treating growing tomato plants with an effective amount of a composition containing, together with a diluent, at least one compound of the formula:

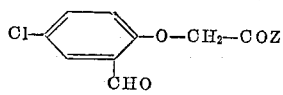

where Z is selected from the class consisting of —OH, —OM, —OHC₃ and —NH₂, where M is a cation of an inorganic base, the concentration of the said compound being 0.004 to 0.1% when the composition is liquid and 0.04 to 1% when the composition is solid.

2. A method of propagating plants by cuttings which comprises contacting cuttings with an effective amount of a composition containing, together with a diluent, at least one compound of the formula:

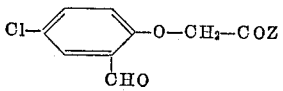

where Z is selected from the class consisting of —OH, —OM, —OCH₃ and NH₂, where M is a cation of an inorganic base, the concentration of the said compound being 0.004 to 0.1% when the composition is liquid and 0.04 to 1% when the composition is solid.

References Cited in the file of this patent

UNITED STATES PATENTS 2,396,513     Jones _____ Mar. 12, 1946

OTHER REFERENCES

Stoermer, in "Annalen der Chemie," 312, page 326, 1900.

Crocker: "Growth of Plants," copyright 1948 by Reinhold Publishing Corp., New York, pages 204 to 226 inc.

Weintraub et al., in "Agri. and Food Chemistry," vol. 2, No. 19, September 15, 1954, pages 996 to 999.